(12) United States Patent
Lee et al.

(10) Patent No.: US 9,495,067 B2
(45) Date of Patent: Nov. 15, 2016

(54) METHOD AND APPARATUS FOR PROVIDING THREE-DIMENSIONAL USER INTERFACE IN AN ELECTRONIC DEVICE

(71) Applicant: Samsung Electronics Co., Ltd., Gyeonggi-do (KR)

(72) Inventors: Yeonhee Lee, Seoul (KR); Junghyun Shim, Gyeonggi-do (KR); Sujin Yeon, Seoul (KR); Yongyeon Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 140 days.

(21) Appl. No.: 13/708,293

(22) Filed: Dec. 7, 2012

(65) Prior Publication Data
US 2013/0147794 A1    Jun. 13, 2013

(30) Foreign Application Priority Data
Dec. 8, 2011    (KR) .................... 10-2011-0131161

(51) Int. Cl.
*G06T 15/40* (2011.01)
*G06F 3/048* (2013.01)
(Continued)

(52) U.S. Cl.
CPC ........... *G06F 3/04815* (2013.01); *G06F 3/016* (2013.01); *G06F 3/0486* (2013.01); *G06F 3/04812* (2013.01); *G06F 3/04842* (2013.01); *G06F 3/04845* (2013.01); *G06T 19/20* (2013.01); *G09G 5/14* (2013.01);
(Continued)

(58) Field of Classification Search
CPC ... G06T 19/00; G06T 15/405; G06F 9/4443; G06F 3/0481; G06F 3/04815
USPC .................. 345/419, 422; 715/765, 794, 848
See application file for complete search history.

(56) References Cited

U.S. PATENT DOCUMENTS 6,552,721 B1 *   4/2003   Ishikawa ........................ 345/418
6,657,637 B1 *  12/2003   Inagaki et al. ................ 345/629
(Continued)

FOREIGN PATENT DOCUMENTS

EP         1 990 077         11/2008
EP         2 405 403          1/2012
(Continued)

OTHER PUBLICATIONS

European Search Report dated Jun. 22, 2015 issued in counterpart application No. 12855801.2-1972, 6 pages.

*Primary Examiner* — Jacinta M Crawford
*Assistant Examiner* — Yi Yang
(74) *Attorney, Agent, or Firm* — The Farrell Law Firm, P.C.

(57) ABSTRACT

Methods and apparatus for providing a three-dimensional user interface in an electronic device are provided. An editing mode of a three-dimensional user interface screen is executed in which a plurality of content items is displayed in a three-dimensional space. It is determined whether a content item from among the plurality of content items is moved in the editing mode. When it is determined that the content item is moved, it is determined whether the content item overlaps a portion of an area of another content item from among the plurality of content items. When it is determined that the content item overlaps the portion of the area of the other content item, the content item is moved a minimum distance along a Z-axis direction so that the content item no longer overlaps the portion of the area of the other content item. The Z-axis direction indicates perspective information.

18 Claims, 8 Drawing Sheets

(51) Int. Cl.
    *G06F 3/0481*    (2013.01)
    *G06T 19/20*    (2011.01)
    *G06F 3/0486*    (2013.01)
    *G06F 3/01*    (2006.01)
    *G06F 3/0484*    (2013.01)
    *G09G 5/14*    (2006.01)

(52) U.S. Cl.
    CPC . *G06F2203/014* (2013.01); *G06T 2219/2016* (2013.01); *G09G 2340/0464* (2013.01); *G09G 2340/12* (2013.01); *G09G 2354/00* (2013.01)

(56) References Cited

U.S. PATENT DOCUMENTS

| | | | | |
|---|---|---|---|---|
| 8,648,855 | B2 * | 2/2014 | Pedersen | 345/423 |
| 8,745,514 | B1 * | 6/2014 | Davidson | 715/766 |
| 2002/0085219 | A1 * | 7/2002 | Ramamoorthy | 358/1.9 |
| 2007/0097113 | A1 * | 5/2007 | Lee et al. | 345/419 |
| 2007/0146360 | A1 * | 6/2007 | Clatworthy et al. | 345/419 |
| 2009/0217187 | A1 * | 8/2009 | Kendall et al. | 715/765 |
| 2010/0162151 | A1 * | 6/2010 | Class et al. | 715/765 |
| 2010/0223563 | A1 * | 9/2010 | Green | 715/762 |
| 2011/0193860 | A1 * | 8/2011 | Lee et al. | 345/419 |
| 2012/0007857 | A1 * | 1/2012 | Noda | G06F 3/04812 345/419 |
| 2012/0293636 | A1 * | 11/2012 | Gilson | 348/51 |

FOREIGN PATENT DOCUMENTS

| | | |
|---|---|---|
| KR | 1020010015674 | 2/2001 |
| KR | 100679039 | 2/2007 |

* cited by examiner

METHOD AND APPARATUS FOR PROVIDING THREE-DIMENSIONAL USER INTERFACE IN AN ELECTRONIC DEVICE

PRIORITY

This application claims priority under 35 U.S.C. §119(a) to a Korean patent application filed on Dec. 8, 2011 in the Korean Intellectual Property Office, and assigned Serial No. 10-2011-0131161, the entire disclosure of which is incorporated herein by reference.

BACKGROUND OF THE INVENTION

1. Field of the Invention

The present invention relates generally to a method and an apparatus for providing a user interface, and more particularly, to a method and an apparatus for providing a three-dimensional user interface in an electronic device, such that a content item may be easily arranged in a three-dimensional space.

2. Description of the Related Art

Electronic devices provide various functions such as, for example, a music reproducing function, a message transmission and receiving function, a digital broadcast receiving function, a short range wireless communication function, and an Internet access function. Particularly, an electronic device may employ a touch screen in order to provide a slimmer profile and facilitate an input action. The electronic device, which employs the touch screen, displays a plurality of images representing content (hereinafter, "content item") on a screen (e.g., a home screen or a menu screen). The electronic device provides a screen-editing mode in which a user can freely change a position of content items. The electronic device provides a three-dimensional image output function to output an image in a three-dimensional manner. Specifically, the electronic device can provide a solid, realistic three-dimensional screen by adding spatial information (Z axis) to two-dimensional information of a horizontal line (X axis) and a vertical line (Y axis). Because the screen is provided in the three-dimensional manner, a user of the electronic device may experience difficulty in manipulating a content item (e.g., rearrangement). For example, in a conventional electronic device, content items are placed freely on a three-dimensional space such that a content item arrangement screen looks visually complicated. In addition, in the conventional electronic device, the user may have difficulty in recognizing a space occupied by the content item. Accordingly, when the content item is moved to a different location, interference (or collision) with another content item may be difficult to identify. The above-described problem becomes more serious when the content items have an irregular shape and when the shape or orientation of the content items is varied depending on a certain condition.

SUMMARY OF THE INVENTION

The present invention has been made to address at least the above problems and/or disadvantages and to provide at least the advantages described below. Accordingly, an aspect of the present invention provides a method and an apparatus for providing a three-dimensional user interface in an electronic device in which a user may easily manipulate content items in a three-dimensional space.

Another aspect of the present invention provides a method and an apparatus for providing a three-dimensional user interface in an electronic device in which, when rearranging a content item, items may not be arranged to overlap with one another.

An additional aspect of the present invention provides a method and an apparatus for providing a three-dimensional user interface in an electronic device in which a bounding box is provided to an outer edge of a content item in an editing mode in order for a user to easily recognize a space occupied by the content item.

A further aspect of the present invention provides a method and an apparatus for providing a three-dimensional user interface in an electronic device in which a base line along which content items are aligned in an editing mode is provided, and the content items are arranged according to the base line, thereby reducing complexity in arranging the content items.

In accordance with an aspect of the present invention, a method of providing a three-dimensional user interface in an electronic device is provided. An editing mode of a three-dimensional user interface screen is executed in which a plurality of content items is displayed in a three-dimensional space. It is determined whether a content item from among the plurality of content items is moved in the editing mode. When it is determined that the content item is moved, it is determined whether the content item overlaps a portion of an area of another content item from among the plurality of content items. When it is determined that the content item overlaps the portion of the area of the other content item, the content item is moved a minimum distance along a Z-axis direction so that the content item no longer overlaps the portion of the area of the other content item. The Z-axis direction indicates perspective information.

In accordance with another aspect of the present invention, a three-dimensional user interface in an electronic device is provided. The three-dimensional user interface includes a touch screen configured to output a three-dimensional user interface screen in which a plurality of content items is displayed in a three-dimensional space. The three-dimensional user interface also includes a controller configured to determine whether a content item from among the plurality of content items is moved in an editing mode. When it is determined that the content item is moved, the controller is configured to determine whether the content item overlaps a portion of an area of another content item from among the plurality of content items. When it is determined that the content item overlaps the portion of the area of the other content item, the controller is configured to move the content item a minimum distance along a Z-axis direction so that the content item no longer overlaps the portion of the area of the other content item, wherein the Z-axis direction indicates perspective information.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Embodiments of the present invention are described in detail with reference to the accompanying drawings. The same or similar components may be designated by the same or similar reference numbers although they are illustrated in different drawings. Detailed descriptions of constructions or processes known in the art may be omitted to avoid obscuring the subject matter of the present invention.

Figure 1:
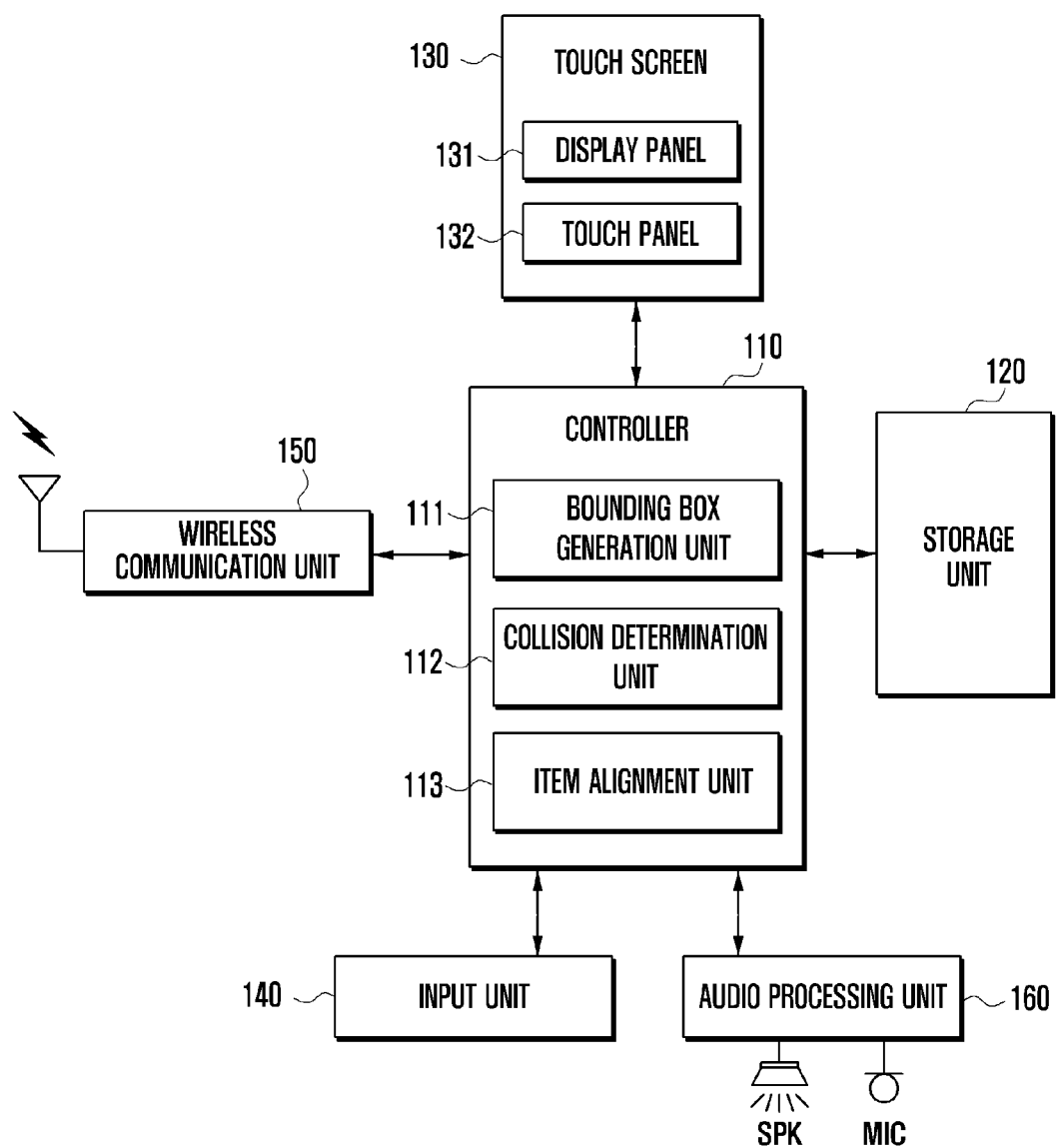
FIG. 1 is a block diagram illustrating a schematic configuration of an electronic device, according to an embodiment of the present invention.

FIG. 1 is a block diagram illustrating a schematic configuration of an electronic device, according to an embodiment of the present invention.

Referring to FIG. 1, an electronic device 100 includes an audio processing unit 160, a wireless communication unit 150, an input unit 140, a touch screen 130, a storage unit 120, and a controller 110. The touch screen 130 includes a display panel 131 and a touch panel 132. The controller 110 includes a bounding box generation unit 111, a collision determination unit 112, and an item alignment unit 113.

The wireless communication unit 150 forms a communication channel for performing a call, such as, for example, a voice call or a video call, with a base station and a data communication channel for data transmission. The wireless communication unit 150 may include a radio frequency transmission unit that performs an up conversion and amplification on a transmission signal, and a radio frequency receiving unit that performs low noise amplification and a down conversion on a received signal. The wireless communication unit 150 may receive a content such as, for example, a music file, an image file, a video file, a widget application program, an electronic book, or a game, from another electronic device or a web server. The wireless communication unit 150 may also transmit the content to the other electronic device or the web server. When the electronic device 100 does not provide a wireless communication function, the wireless communication unit 150 described above may be omitted.

The audio processing unit 160 is connected to a microphone MIC to convert a voice signal received from the microphone MIC into data to be outputted to the controller 110. The audio processing unit 160 is also connected to a speaker SPK to convert a data signal received from the controller 110 into an audible tone to be outputted to the speaker SPK. The audio processing unit 160 converts an analog voice signal inputted from the microphone MIC into a digital voice signal, and converts a digital voice signal inputted from the controller 110 into an analog voice signal to be outputted through the speaker SPK. When a content item, which is moved under a control of the controller 110 in a content item editing mode, collides with another content item, i.e., when the moved content item is overlapped with a portion of the other content item, the audio processing unit 160 outputs an effective sound notifying such event, according to an embodiment of the present invention.

The input unit 140 may include an input key and function keys for receiving numeral or various character information, setting various functions, and controlling a function of the electronic device 100. The function keys may include, for example, an arrow key, a side key, and a shortcut key that are set to perform a particular function. Also, the input unit 140 generates a key signal associated with a user setting and function control of the electronic device 100, and transmits the key signal to the controller 110. Particularly, the input unit 140 transmits, to the controller 110, various input signals for controlling a three-dimensional user interface screen, including, for example, an input signal for turning on or off the editing mode, or an input signal for requesting to move a content item. The input unit 140 may be formed as one or a combination of input means, such as, for example, a button type key pad, a ball joystick, an optical joystick, a wheel key, a touch key, a touch pad, or the touch screen 130.

The touch screen 130 performs an input function and an output function. The touch screen 130 includes the display panel 131 for performing the output function, and the touch panel 132 for performing the input function.

The display panel 131 displays various menus of the electronic device 100, as well as information received from the user or information provided to the user. The display unit 131 provides various screens according to the use of the electronic device 100, including, for example, a standby screen (a home screen), a menu screen, a content list screen, a call screen, a schedule management screen, a phonebook screen, or a web page output screen. Particularly, the display panel 131 provides a screen in which a plurality of content items, such as, for example, the standby screen (the home screen), the menu screen, or the content list screen, is displayed in a three-dimensional manner having longitudinal or X-axis information, vertical or Y-axis information, and depth, perspective or Z-axis information. In the three-dimensional screen, at least one content item is arranged in a three-dimensional space. The content item is formed in a three-dimensional manner and is provided in a static form (hereinafter, "stationary content item") or in a dynamic form that rotates or varies a shape thereof, according to a predefined rule.

The display panel 131 may also display a bounding box indicating a space allocated to each content item that is being displayed on the three-dimensional screen in the editing mode. The bounding box may be formed in a rectangular parallelepiped shape. A detailed description of the bounding box is provided below with reference to FIGS. 4 to 6.

The display panel 131 may display multiple base lines for aligning the content item. The base line may be displayed at a predetermined interval with respect to each X-axis, Y-axis and Z-axis. The display panel 131 may display the three-dimensional screen in which the content item is rearranged by the user, which is described in detail below with reference to FIGS. 3 to 8. The display panel 131 may be formed in, for example, a Liquid Crystal Display (LCD) or an Organic Light Emitting Diode (OLED).

The touch panel 132 may be mounted on a front surface of the display panel 131, and generates a touch event according to a touch by a touch input device, such as, for example, a user's finger or a stylus. The touch panel 132 transmits the generated touch event to the controller 110. The touch panel 132 recognizes a touch based on a change in a physical quantity, such as, for example, a capacitance or a resistance, according to the touch by the touch input device. The touch panel 132 transmits a touch type, such as, for example, a tap, a drag, a flick, a double touch, a long touch, or a multi touch, and location information of the touch to the controller 110. The touch panel 132, according to an embodiment of the present invention transmits, to the controller 110, various touch events for controlling the three-dimensional user interface screen such as, for example, the touch event for turning on or off the editing mode or the touch event for touching a specific content item, moving the touch to other location, and releasing the touch (hereinafter, "drag and drop").

The storage unit 120 may include an Operating System (OS) of the electronic device 100, an application program for other optional functions, such as, for example, a sound reproducing function, an image or video reproducing function, or a broadcast reproducing function, and user data and data transmitted or received during communication. For example, the storage unit 120 may store a key map or a menu map for operating the touch screen 130. The key map and the menu map may be configured in various forms. For example, the key map can be a keyboard map, a 3*4 key map, a QWERTY key map, or a control key map for controlling an operation of an application program that is currently activated. Also, the menu map may be a menu map for controlling an operation of an application program that is being activated. Further, the storage unit 120 may store content such as, for example, an image file, a video file, a game, a music file, an electronic book, or a widget application program. Particularly, the storage unit 120, according to an embodiment of the present invention, may store an editing mode application program for controlling the editing mode of the three-dimensional user interface screen. The editing mode application program may include, for example, a routine for turning on/off the editing mode, a routine for generating the bounding box of the content item, a routine for determining whether the content items collide each other, a routine for aligning the content items along the base line, and a routine for extracting and comparing a center value on the Z axis of the colliding content items. The storage unit 120 may also include bounding box information, such as, for example, a size or a coordinate of a vertex of the content items and base line information for aligning the content items. The storage unit 120 may store a minimum separation distance (hereinafter, "offset value") between the bounding boxes of respective content items.

The controller 110 controls an overall operation of the electronic device 100, controls a signal flow between internal blocks of the electronic device 100, and performs a data processing function to process data. Particularly, the controller 110, according to an embodiment of the present invention, controls the editing mode of the three-dimensional user interface screen. The controller 110 includes the bounding box generation unit 111, the collision determination unit 112, and the item alignment unit 113.

The bounding box generation unit 111 generates the bounding box of the content item when the editing mode is executed. The bounding box allows the user to easily recognize a space allocated to the content item and may be used by the collision determination unit 112 in determining whether the content item collides with another content item when the content item is moved. The bounding box generation unit 111 may generate the bounding box differently according to a type of the content item. For example, for a static content item of which size and shape do not vary, the bounding box generation unit 111 generates a box in the rectangular parallelepiped shape by using a minimum value and a maximum value on each X-axis, Y-axis and Z-axis of the static content item. For a dynamic content item, which rotates or varies its shape or orientation according to a predefined rule, the bounding box generation unit 111 generates the bounding box by considering movement of the dynamic content item, which is described in greater detail below with reference to FIGS. 4 to 6. It is described that the bounding box is generated when the editing mode is entered; however, embodiments of the present invention is not limited thereto. In another embodiment of the present invention, the bounding box is generated when new content is installed or received from another terminal. The generated bounding box is mapped with the content item to be stored, and the mapped bounding box is called when the editing mode is entered.

The collision determination unit 112 determines whether the content item collides with another content item, when the content item is moved in the editing mode. Specifically, the collision determination unit 112 determines whether the content item is overlapped with a portion of the area of the other content item when the content item is moved in the editing mode. The collision determination unit 112 determines whether collision occurs based on the bounding box of the content item. In other words, when portions of the areas of the content items are not actually overlapped with each other, the collision determination unit 112 determines that the collision occurs when the bounding boxes of the content items are overlapped. Thus, by determining whether the collision occurs using the bounding box, the collision determination unit 112 easily determines whether the collision occurs, even when the content item has an irregular, variable shape and the content item moves dynamically.

The item alignment unit 113 aligns the content item based on a plurality of base lines, which are displayed at a predetermined interval with respect to the X-axis, the Y-axis and the Z-axis. For example, the item alignment unit 113 determines whether the bounding box of the content item is aligned with the base line. Specifically, the item alignment unit 113 determines whether one of sides on the X-axis, one of sides on the Y-axis, and one of sides on the Z-axis each align with the base line in a corresponding direction. When it is determined that at least one side does not align with the base line in the corresponding direction, the item alignment unit 113 may align a side of the bounding box that does not align with the base line in the corresponding direction with a closest measured base line. A detailed description thereof is provided below with reference to FIG. 7.

When the content item is moved to collide with another content item, the item alignment unit 113 may compare a center value on the Z-axis of the bounding box of the content item with a center value on the Z-axis of the bounding box of the other content item. When the center value on the Z-axis of the bounding box of the moved content item is greater than the center value on the Z-axis of the bounding box of the other content item, a Z-axis value of the moved content item is increased such that the moved content item is arranged to be placed in front of the other content item. When the center value on the Z-axis of the bounding box of the moved content item is smaller than the center value on the Z-axis of the bounding box of the other content item, the Z-axis value of the moved content item is decreased such that the moved content item is arranged to be placed behind the other content item. The item alignment unit 113 moves the content in a negative direction or a positive direction on the Z-axis by a minimum distance necessary for the moved content item and the other content item not to collide with each other. Specifically, the item alignment unit 113 moves the content item in the negative direction or the positive direction on the Z-axis by a value corresponding to a half of a sum of a z value of the bounding box of the moved content item, and a z value of the bounding box of the other content item minus a difference between the center value on the Z-axis of the bounding box of the moved content item and the center value on the Z-axis of the bounding box of the other content item. For example, if the bounding box of the moved content item has a Z-axis value of 6 and the bounding box of the other content item has a Z-axis value of 10 and the center value on the Z axis of the bounding box of the moved content item is smaller by 2 than the center value on the Z axis of the bounding box of the other content item, the item alignment unit 113 moves the moved content item in the negative direction on the Z axis by 6.

If the bounding box of the moved content item has a Z-axis value of 6 and the bounding box of the other content item has a Z-axis value of 10, and the center value on the Z-axis of the bounding box of the moved content item is greater by 2 than the center value on the Z-axis of the bounding box of the other content item, the item alignment unit 113 moves the moved content item in the positive direction on the Z-axis by 6. The item alignment unit 113 may further move the moved content item on the Z-axis by a preset offset value. A detailed description thereof is provided below with reference to FIG. 8.

Although not shown in FIG. 1, the electronic device 100 may selectively further include other elements to achieve additional functions, such as, for example, a Global Positioning System (GPS) module for receiving location information, a broadcast receiving module for receiving broadcast, a digital sound source reproducing module such as an MP3 module, and an Internet communication module for performing an Internet function. With the convergence of digital devices, there may be many digital devices and modifications thereof, and, it will be appreciated that elements having a level equivalent to the forgoing elements can also be included in the electronic device 100.

Figure 2:
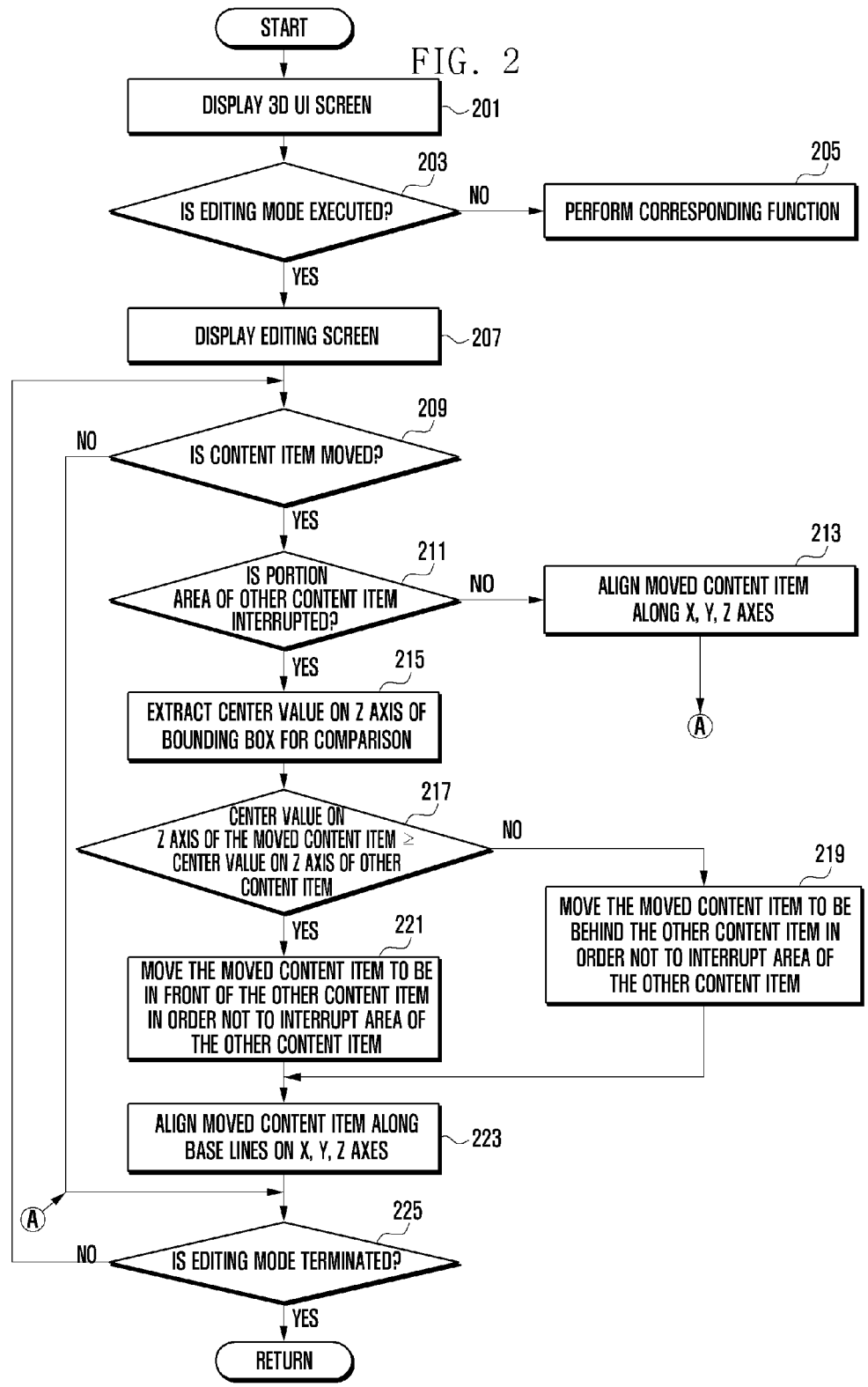
FIG. 2 is a flow chart illustrating a method for providing a three-dimensional user interface in an electronic device, according to an embodiment of the present invention.
Figure 3:
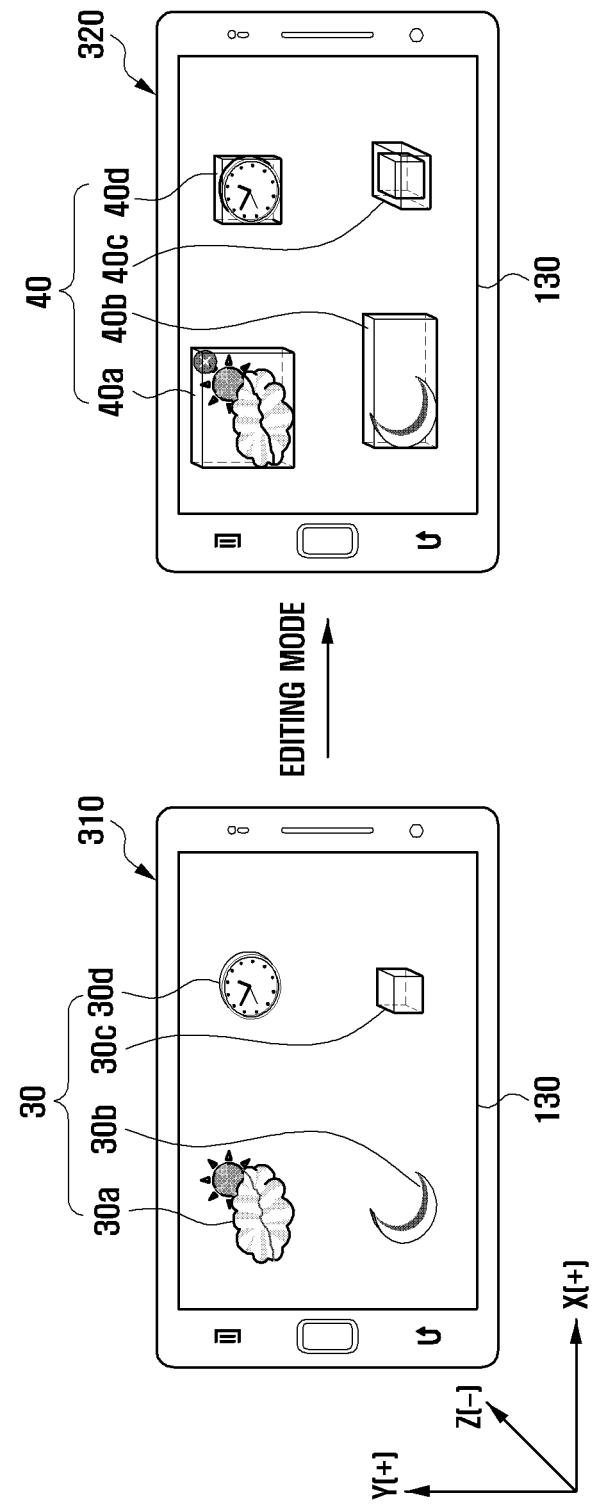
FIG. 3 illustrates a three-dimensional user interface screen in an electronic device, according to an embodiment of the present invention.

FIG. 2 is a flow chart illustrating a method for providing a three-dimensional user interface of an electronic device according to an embodiment of the present invention. FIG. 3 is a screen showing a three dimensional user interface screen of an electronic device, according to an embodiment of the present invention.

Referring to FIGS. 1 through 3, the controller 110 of the electronic device 100 controls the touch screen 130 to output the three-dimensional user interface screen, in step 201. For example, the controller 110 outputs the three-dimensional user interface screen as shown in a screen identified by reference number 310 in FIG. 3. In the three-dimensional user interface screen, content items 30 including 30*a*, 30*b*, 30*c*, 30*d* are disposed in the three-dimensional space. The content items 30 are formed in a three-dimensional form and are formed in a static form (hereinafter, "static content item") or in a dynamically moving form (hereinafter, "dynamic content item"). For example, the dynamic content item may rotate in place or may vary in shape or orientation, according to a predetermined rule. The location of the content items may be defined by a coordinate system shown in a lower left portion of a screen identified by reference number 310. For example, the electronic device 100 defines the location information of the content items by using a three dimensional coordinate system including the X-axis, the Y-axis, and the Z-axis, with a left lower vertex being an origin. Here, an X-axis coordinate indicates horizontal location information, a Y-axis coordinate indicates vertical location information, and a Z-axis coordinate indicates depth or perspective information, i.e., information of distance between the user and the content. In the screen identified by reference number 310, the X-axis and the Y-axis of the coordinate system have a positive value, and the Z-axis has a negative value. However, this coordinate system is provided as an example, and embodiments of the present invention are not limited thereto.

The controller 110 determines whether the editing mode is performed, in step 203. The editing mode refers to a mode in which a location of the content items can be moved or deleted. The editing mode may be performed by an input from a preset key signal, selection of a menu, or a long touch on the home screen or the menu screen.

When the editing mode is not performed, the controller 110 proceeds to step 205 to perform a corresponding function. For example, the controller 110 may perform a music reproducing function, a video reproducing function, or an Internet access function according to a user's request, or may maintain a standby state. When the editing mode is executed, the controller 110 proceeds to step 207 to control the touch screen 130 to output/display an editing screen. For example, the controller 110 displays bounding boxes 40, including 40*a*, 40*b*, 40*c*, 40*d*, on each content item, as shown in a screen identified by reference number 320 in FIG. 3. The bounding boxes 40 are used to allow the user to easily recognize a space allocated to each content item, and to determine whether the content items collide with each other. Specifically, the controller 110 determines whether the content items collide with each other based on a size of the bounding box 40 of each content item (e.g., an area occupied by the bounding box or the area occupied by the bounding box added by the offset value). A method of generating the bounding box 40 may be varied according to a type of the content item. For example, for the static content having a constant size or shape, i.e., occupying a constant space as the content item 30*d*, the bounding box 40*d* is a rectangular parallelepiped defined by outermost coordinate values of the static content item. Specifically, the bounding box 40*d* is a rectangular parallelepiped defined by respective minimum values and maximum values on the X-axis, the Y-axis and the Z-axis coordinates of the static content item. The dynamic content item rotates or has a variable shape or orientation according to a predetermined rule, as in, for example, content items 30*a*, 30*b*, and 30*c*. The bounding box 40 may be formed in consideration of a change of a space occupied by the dynamic content item according to the movement of the dynamic content item, which is described in detail below with reference to FIGS. 4 through 6.

The controller 110 determines whether the movement of a specific content item is detected, in step 209. When the movement of the specific content item is not detected, the controller 110 proceeds to step 225 to determine if the editing mode is terminated. When the movement of the specific content item is detected, the controller 110 proceeds to step 211 to determine whether the moved specific content item collides with another content item. Specifically, when the movement of the specific content item is completed (i.e., touch is released), the controller 110 determines whether bounding box of the moved specific content item overlaps with a portion of an area of the bounding box of the other content item. The controller 110 determines whether a portion of an area corresponding to a size of the bounding box added by the offset value is overlapped.

When the bounding box of the moved specific content item does not overlap with the portion area of the bounding box of the other content item, the controller 110 align the moved specific content item along the base lines on the X-axis, the Y-axis, and the Z-axis, in step 213, which is described in detail below with reference to FIG. 7. The controller 110 then proceeds to step 225 to determine if the editing mode is terminated.

When the bounding box of the moved specific content item overlaps with the portion area of the bounding box of the other content item in step 211, the controller 110 compares the center value on the Z-axis of the bounding box of the moved specific content item and the center value on the Z-axis of the bounding box of the other content item, in step 215.

The controller 110 determines whether the center value on the Z-axis of the bounding box of the moved content item is greater than the center value on the Z-axis of the bounding box of the other content item, in step 217. When it is determined that the center value on the Z-axis of the bounding box of the moved content item is less than the center value on the Z-axis of the bounding box of the other content item in step 217, the controller 110 moves the moved content item to be positioned behind the other content item, in step 219. When it is determined that the center value on the Z-axis of the bounding box of the moved content item is greater than the center value on the Z-axis of the bounding box of the other content item in step 217, the controller 110 moves the moved content item to be positioned in front of the other content item, in step 221, which is described in detail below with reference to FIG. 8.

The controller 110 aligns the moved content item along the base lines on the X-axis, the Y-axis, and the Z-axis. The controller 110 determines whether the editing mode is terminated, in step 225. When the editing mode is not terminated, the controller 110 returns to repeat the above-described process from step 209. When the editing mode is terminated, the controller 110 returns to repeat the above-described process from step 201.

Although it is described that overlapping of a portion area is determined after the touch is released, the embodiments of the present invention are not limited thereto. For example, when moving the specific content item, if the bounding box of the moved content item is overlapped with the bounding box of the other content item, the controller 110 may notify the user through at least one of a visual feedback, an acoustic feedback, and a tactile feedback. For example, in order to notify the user of the collision of the moved content item and the other content item, the controller 110 may change a color of the moved content item, output an effective sound, or output vibration.

Figure 4:
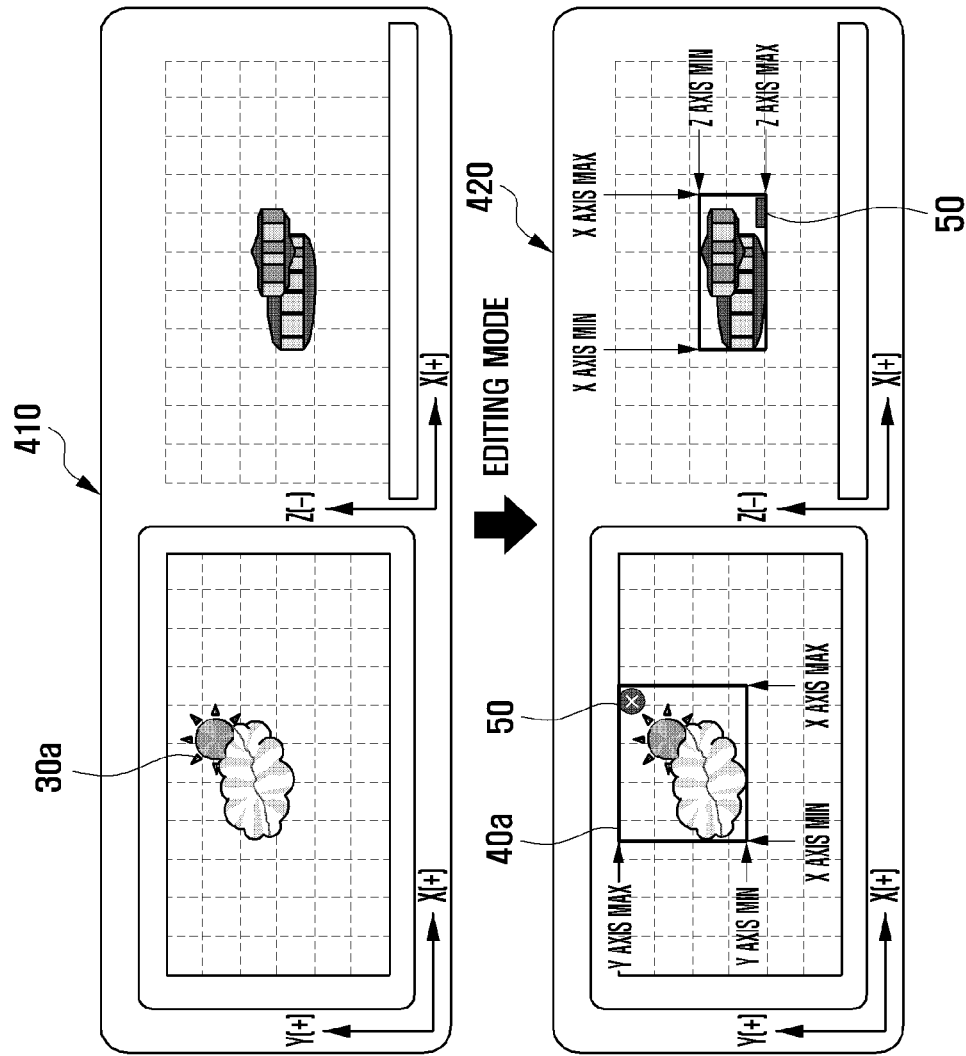
FIGS. 4 through 6 illustrate screens showing a method of generating a bounding box of a content item, according to an embodiment of the present invention.
Figure 5:
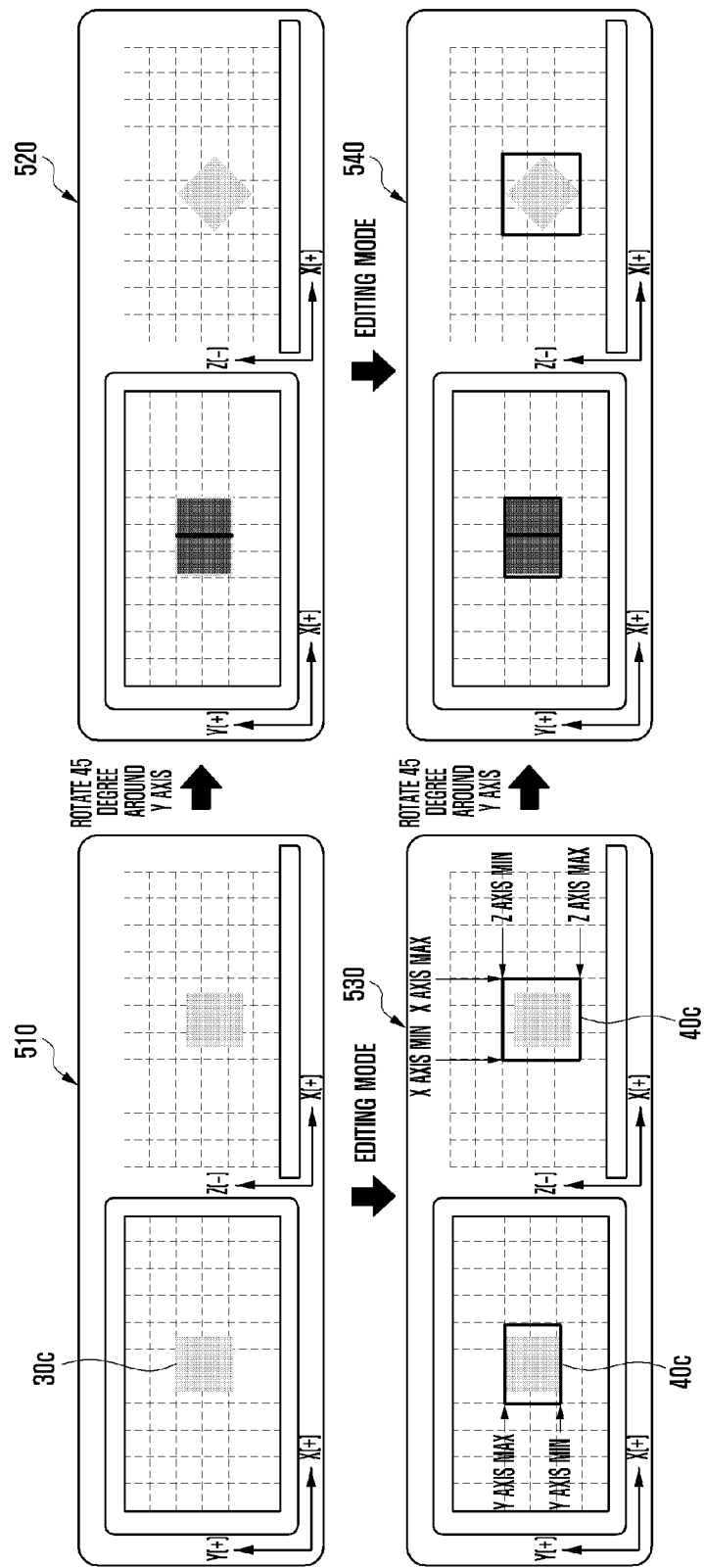
Figure 6:
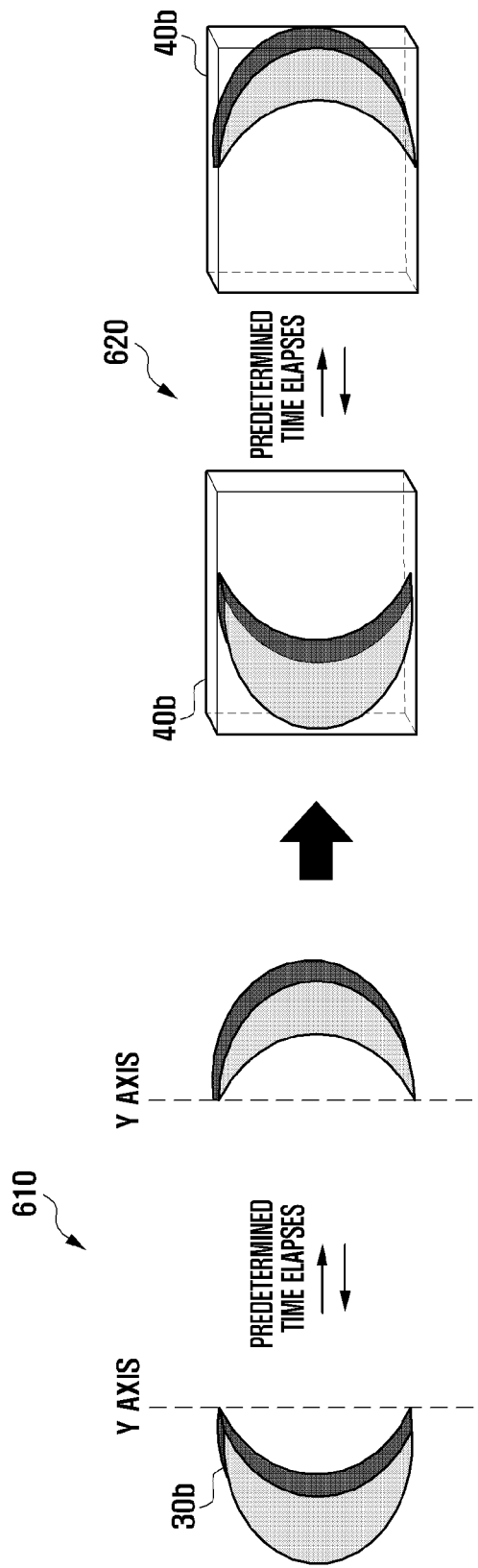

FIGS. 4 through 6 illustrate screens showing a method of generating a bounding box of a content item, according to an embodiment of the present invention.

Referring to FIGS. 1 through 6, the editing mode may be executed in the three-dimensional user interface screen as shown in a screen 410 in FIG. 4. When the editing mode is executed, the controller 110 outputs an editing screen 420. The controller 110 generates the bounding box 40a in an outer edge of the content item 30a. If the content item 30a includes a delete icon 50 for a delete function and assigned to a right upper portion in the editing mode, the controller 110 may generate the bounding box 40a to include the delete icon 50 as shown in the editing screen 420.

As shown in FIG. 5, when the content item for which the bounding box is to be generated is the content item 30c in the rectangular parallelepiped shape which rotates with respect to a center axis that is a Y-axis component, the controller 110 does not determine the size of the bounding box 40c based on a front view thereof, as show in a screen 510. Instead the size of the bounding box 40c is determined based on the content item 30c rotated 45 degrees, as shown in a screen 520. Specifically, the controller 110 determines the size of the bounding box 40c by using the maximum value and the minimum value on the X-axis and the Z-axis when the content item 30c is rotated 45 degrees, as shown in screens 530 and 540. An X-axis value and a Z-axis value of the bounding box 40c becomes the same as a diagonal length of a X-axis value and a Z-axis value of the content item 30c. A Y-axis value of the bounding box 40c is the same as a Y-axis value of the content item 30c because the Y-axis of the bounding box 40c does not vary according to the rotation of the content item 30c.

For the content item 30b which rotates with respect to the Y-axis to invert a position thereof, as shown in a screen 610 of FIG. 6, the controller 110 determines the size of the bounding box 40b, as shown in a screen 620. Specifically, an X-axis value of the bounding box 40bis increased twice an X-axis value of the content item 30b. A Y-axis value and a Z-axis value of the bounding box 40b are the same as a Y-axis value and a Z-axis value of the content item 30b.

Generating the bounding box as described above may be performed during a manufacturing process of the electronic device 100 or may be performed on the content item representing a new content when the new content is installed on the electronic device 100.

Figure 7:
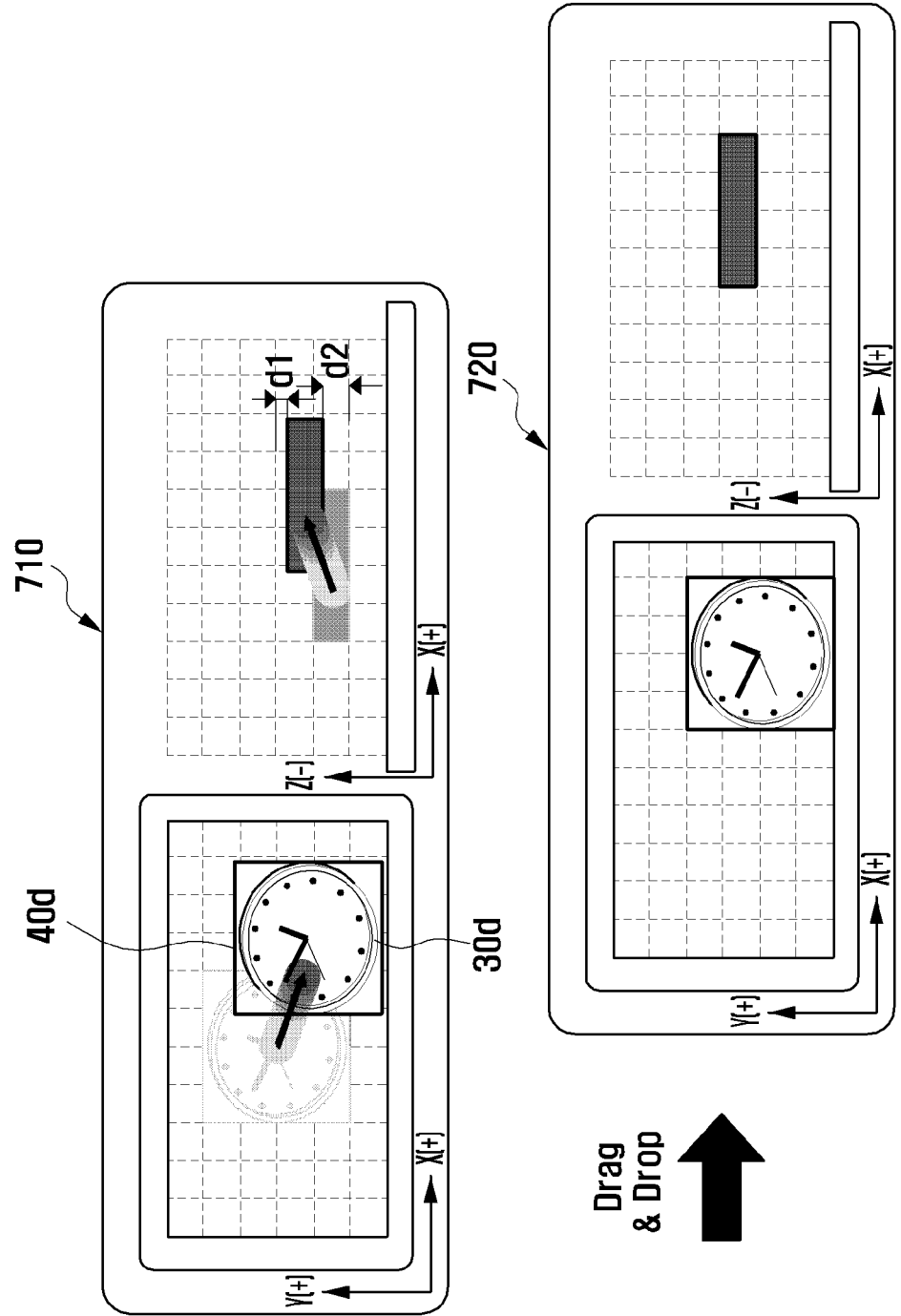
FIG. 7 illustrates a screen showing a method of moving a content item, according to an embodiment of the present invention.

FIG. 7 illustrates a screen showing a method of moving a content item, according to an embodiment of the present invention.

Referring to FIG. 7, as shown in a screen 710, the user moves a location of the specific content item 30d in the editing screen. The controller 110 of the electronic device 100 controls the touch screen 130 to output the editing screen by separating a first screen for moving the content item along the X-axis and the Y-axis and a second screen for moving the content along the X-axis and the Z-axis. Alternatively, the controller 110 controls the touch screen 130 to output the second screen when movement of the content item along the X-axis and the Y-axis is completed after the output of the first screen.

Alternatively, in another embodiment of the present invention, when the electronic device 100 includes a sensor such as, for example, a tilt sensor, a gravity sensor, or a geomagnetic sensor, for sensing a tilt, the movement along the Z-axis is controlled through the tilt of the electronic device 100. For example, the content item is moved along the X-axis and the Y-axis according to a touch movement on the touch screen 130, and the content item is moved along the Z-axis according to the tilt of the electronic device 100.

Also, in another embodiment of the present invention, when the electronic device 100 has a first tilt range (e.g., tilt between 0 degree, at which the touch screen 130 is parallel with a horizontal, to 45 degrees), the content item is moved along the X-axis and the Y-axis corresponding to the touch movement on the touch screen 130. When the electronic device 100 has a second tilt (e.g., tilt between 45 degrees to 90 degrees, at which the touch screen 130 is perpendicular to horizontal), the content item is moved along the X-axis and the Z-axis corresponding to the touch movement on the touch screen 130. The screen 710 shows the specific content 30d moved in the positive direction on the X-axis, in the negative direction on the Y-axis, and in the negative direction on the Z-axis.

When movement of the specific content item 30d is completed, the controller 110 determines whether the bounding box 40d of the content item 30d is arranged to align with a preset base line. Specifically, the controller 110 determines whether one of sides on the X-axis, one of sides on the Y-axis, and one of sides on the Z-axis each align with base lines of a corresponding direction. When it is determined that at least one side does not align with the base line in the corresponding direction, the controller 110 measures respective distances between the sides of the bounding box 40d that do not align with the base lines and the base lines located closest thereto. As shown in a screen 720, the controller 110 aligns the side of the bounding box 40d, which does not align with the base line, with the base line measured to be the closest thereto. With respect to the Z-axis direction, for example, when a distance d1 between a first side on the Z-axis and a first base line is shorter than a distance d2 between a second side on the Z-axis and a second base line as shown in the screen 710, the controller 110 moves the content item 30d such that the first side on the Z-axis aligns with the first base line, as shown in the screen 720. The same methodology applies to the X-axis and the Y-axis.

Figure 8:
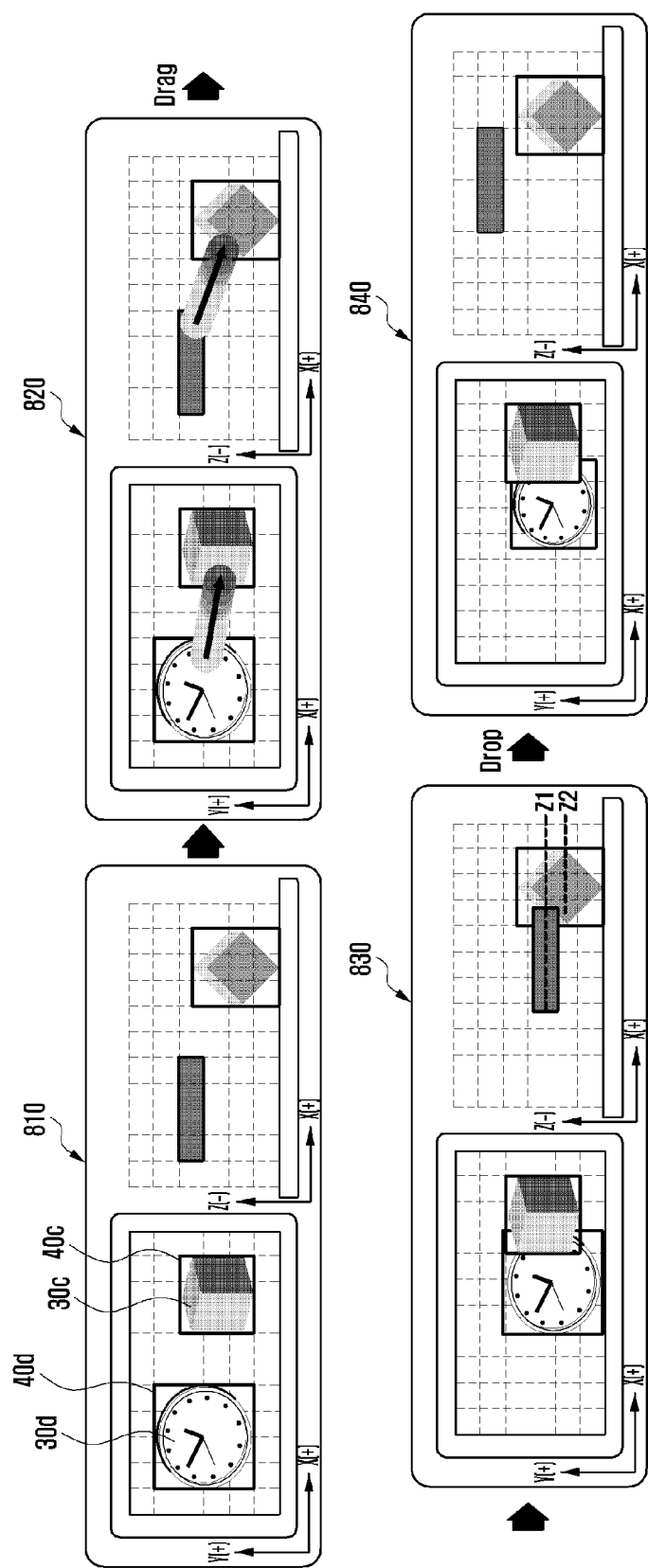
FIG. 8 illustrates a screen showing a method of handling a collision between content items, according to another embodiment of the present invention.

FIG. 8 illustrates a screen showing a method of handling a collision between content items, according to another embodiment of the present invention.

Referring to FIG. 8, when the editing mode is executed, the controller 110 may output an editing screen 810. The controller 110 displays the bounding boxes 40c, 40d indicating an area allocated to the respective content items 30c, 30d, and a plurality of base lines for aligning the content items 30c, 30d. The user moves the specific content item 30d to a location overlapping with the other content item 30c by a drag and drop operation, as shown in screens 820 and 830. The controller 110 calculates and compares the center value Z2 on the Z-axis of the bounding box 40c of the content item 30c with the center value Z1 on the Z-axis of the bounding box 40d of the other content item 30d. According to a comparison result, the controller 110 moves the location of the specific content item 30d along the Z-axis. Referring to the screen 830, a center value Z1 on the Z-axis of the bounding box 40d of the content item 30d is smaller than a center value Z2 on the Z-axis of the bounding box 40c of the other content item 30c. Thus, the controller 110 moves the specific content item 30d to be behind the other content item 30c, as shown in a screen 840. The controller 110 moves the specific content item 30d within a minimum range necessary for the bounding box 40d of the content item 30d not to be overlapped with the bounding box 40c of the other content item 30c. Specifically, the controller 110 moves the specific content item in the negative direction or the positive direction on the Z-axis by a value corresponding to a half of a sum of the z value of the bounding box 40d of the specific content item 30d and the z value of the bounding box 40c of the other content item 30c minus a difference between the center value on the Z-axis of the bounding box 40d of the specific content item 30d and the center value on the Z-axis of the bounding box 40c of the other content item 30c. For example, if the bounding box 40d of the specific content item 30d has a z value of 6 and the bounding box 40c of the other content item 30c has a z value of 10, and the center value on the Z-axis of the bounding box 40d of the specific content item 30d is smaller by 2 than the center value on the Z-axis of the bounding box 40c of the other content item 30c, the item alignment unit 113 moves the specific content item 30d in the negative direction on the Z-axis by 6.

To the contrary, if the bounding box 40d of the specific content item 30d has a z value of 6 and the bounding box 40c of the other content item 30c has a z value of 10, and the center value on the Z-axis of the bounding box 40d of the specific content item 30d is greater by 2 than the center value on the Z-axis of the bounding box 40c of the other content item 30c, the item alignment unit 113 moves the specific content item 30d in the positive direction on the Z-axis by 6. The item alignment unit 113 moves the moved content item on the Z-axis further by a preset offset value, e.g., 1. The purpose of this is to allow the respective content items to have a minimum separation distance therebetween.

When movement of the specific content item 30d is completed, the controller 110 arranges the location of the specific content item 30d to align with the base lines on the X-axis, the Y-axis, and the Z-axis that is closest to the sides of the bounding box 40d on the X-axis, the Y-axis, and the Z-axis, as described above with reference to FIG. 7. A method of positioning the moved content item in front of the other content item is similar to the method described with reference to FIG. 8, with the only difference being the moving direction. In this manner, according to an embodiment of the present invention, the content item may be aligned according to a predetermined rule (base line) when collision of the content items occurs and movement of the content item from a location desired by the user may be minimized.

The foregoing method for providing a three-dimensional user interface of an electronic device of embodiment of the present invention may be implemented in an executable program command form by various computer means and may be recorded in a computer readable recording medium. The computer readable recording medium may include a program command, a data file, and a data structure individually or a combination thereof. The program command recorded in a recording medium may be specially designed or configured for the embodiments of the present invention or may be known to be used to a person having ordinary skill in a computer software field. The computer readable recording medium includes, for example, Magnetic Media such as a hard disk, a floppy disk, or magnetic tape, Optical Media such as a Compact Disc Read Only Memory (CD-ROM) or a Digital Versatile Disc (DVD), Magneto-Optical Media such as a floptical disk, and a hardware device such as ROM, RAM, or flash memory. The program command includes a machine language code created by a complier and a high-level language code executable by a computer using an interpreter. The foregoing hardware device may be configured to be operated as at least one software module to perform an operation of the embodiments of the present invention.

As described above, according to embodiments of the present invention, content items may be arranged not to overlap each other. Also, a space allocated to the content item is displayed as the bounding box in the editing mode such that a user may easily identify whether a collision with another content item occurs when rearranging the content item. Further, in embodiments of the present invention, the content item is aligned along the base line for arranging the content item. Accordingly, arrangement of the content item may not be complicated.

While the invention has been shown and described with reference to certain embodiments thereof, it will be understood by those skilled in the art that various changes in form and detail may be made therein without departing from the spirit and scope of the present invention, as defined in the appended claims.

What is claimed is:

1. A method of providing a three-dimensional user interface in an electronic device, the method comprising the steps of:

executing an editing mode of a three-dimensional user interface screen in which a plurality of three-dimensional content items is displayed, wherein the editing mode is a mode in which a location of at least one of the plurality of three-dimensional content items can be moved to any position in the three-dimensional user interface screen pointed to by a user input;

displaying an editing screen in response to execution of the editing mode;

determining whether a three-dimensional content item from among the plurality of three-dimensional content items is moved in the editing screen;

when it is determined that the three-dimensional content item is moved, determining whether the moved three-dimensional content item overlaps a portion of another three-dimensional content item from among the plurality of three-dimensional content items; and when it is determined that the moved three-dimensional content item overlaps the portion of the another three-dimensional content item, moving the moved three-dimensional content item a minimum distance along a Z-axis direction so that the moved three-dimensional content item no longer overlaps the portion of the another three-dimensional content item, wherein moving the moved three-dimensional content item comprises:

comparing a center value of a Z-axis component of a bounding box of the moved three-dimensional content item with a center value of a Z-axis component of a bounding box of the another three-dimensional content item;

when the center value of the Z-axis component of the bounding box of the moved three-dimensional content item is greater than the center value of the Z-axis component of the bounding box of the another three-dimensional content item, increasing a Z-axis coordinate value of the moved three-dimensional content item to place the moved three-dimensional content item in front of the another three-dimensional content item; and when the center value of the Z-axis component of the bounding box of the moved three-dimensional content item is less than the center value of the Z-axis component of the bounding box of the another three-dimensional content item, decreasing the Z-axis coordinate value of the moved three-dimensional content item to place the moved three-dimensional content item behind the another three-dimensional content item, wherein the Z-axis direction indicates perspective information, and wherein each of the plurality of three-dimensional content items is a three-dimensional image used to represent content in the electronic device.

2. The method of claim 1, further comprising:
displaying a bounding box for each of the plurality of three-dimensional content items, indicating a space allocated to each of the plurality of three-dimensional content items, when the editing screen is displayed.

3. The method of claim 2, further comprising:
displaying a plurality of base lines for aligning the plurality of three-dimensional content items, wherein each of the plurality of the base lines is formed on one of an X-axis, a Y-axis and a Z-axis of the three dimensional space when the editing screen is displayed.

4. The method of claim 3, further comprising:
aligning the moved three-dimensional content item on one or more of the plurality of the base lines when it is determined that the moved three-dimensional content item does not overlap the portion of the another three-dimensional content item.

5. The method of claim 1, further comprising:
after increasing or decreasing the Z-axis coordinate value of the moved three-dimensional content item, aligning the moved three-dimensional content item on one or more of a plurality of base lines each formed on one of an X-axis, a Y-axis and a Z-axis of the three dimensional space.

6. The method of claim 1, wherein the plurality of three-dimensional content items comprise:
a static three-dimensional content item that occupies a constant space; and
a dynamic three-dimensional content item that occupies a space that varies according to a predefined rule.

7. The method of claim 6, further comprising:
generating a bounding box of the dynamic three-dimensional content item having a maximum size of a space occupied by the dynamic three-dimensional content item that varies according to the predefined rule.

8. The method of claim 1, wherein moving the moved three-dimensional content item comprises:
adding a preset offset value to the minimum distance and moving the moved three-dimensional content item along the Z-axis direction.

9. The method of claim 1, wherein determining whether the moved three-dimensional content item overlaps the portion of the another three-dimensional content item comprises:
providing at least one of a visual feedback, an acoustic feedback, and a tactile feedback, when the moved three-dimensional content item overlaps the portion of the another three-dimensional content item.

10. An electronic device providing a three-dimensional user interface, the electronic device comprising:
a touch screen configured to output a three-dimensional user interface screen in which a plurality of three-dimensional content items are displayed; and
a controller configured to:
display an editing screen on the touch screen in response to an execution of an editing mode, wherein the editing mode is a mode in which a location of at least one of the plurality of three-dimensional content items can be moved to any position in the three-dimensional user interface screen pointed to by a user input,
determine whether a three-dimensional content item from among the plurality of three-dimensional content items is moved in the editing screen,
when it is determined that the three-dimensional content item is moved, determine whether the moved three-dimensional content item overlaps a portion of another three-dimensional content item from among the plurality of three-dimensional content items, and
when it is determined that the moved three-dimensional content item overlaps the portion of the another three-dimensional content item, move the moved three-dimensional content item a minimum distance along a Z-axis direction so that the moved three-dimensional content item no longer overlaps the portion of the another three-dimensional content item,
compare a center value of a Z-axis component of a bounding box of the moved three-dimensional content item with a center value of a Z-axis component of a bounding box of the another three-dimensional content item,
when the center value of the Z-axis component of the bounding box of the moved three-dimensional content item is greater than the center value of the Z-axis component of the bounding box of the another three-dimensional content item, increase a Z-axis coordinate value of the moved three-dimensional content item to place the moved three-dimensional content item in front of the another three-dimensional content item, and when the center value of the Z-axis component of the bounding box of the moved three-dimensional content item is less than the center value of the Z-axis component of the bounding box of the another three-dimensional content item, decrease the Z-axis coordinate value of the moved three-dimensional content item to place the moved three-dimensional content item behind the another three-dimensional content item, wherein the Z-axis direction indicates perspective information, and wherein each of the plurality of three-dimensional content items is a three-dimensional image used to represent content in the electronic device.

11. The electronic device of claim 10, wherein the controller controls the touch screen to display a bounding box for each of the plurality of three-dimensional content items, indicating a space allocated to each of the plurality of three-dimensional content items, when displaying the editing screen.

12. The electronic device of claim 11, wherein the controller displays a plurality of base lines for aligning the plurality of three-dimensional content items, wherein each of the plurality of the base lines is formed on one of an X-axis, a Y-axis and a Z-axis of the three dimensional space when the editing screen is displayed.

13. The electronic device of claim 12, wherein the controller aligns the moved three-dimensional content item on one or more of the plurality of the base lines when it is determined that the moved three-dimensional content item does not overlap the portion of the another three-dimensional content item.

14. The electronic device of claim 10, wherein the controller, after increasing or decreasing the Z-axis coordinate value of the moved three-dimensional content item, aligns the moved content item on one or more of a plurality of base lines each formed on one of an X-axis, a Y-axis and a Z-axis of the three dimensional space.

15. The electronic device of claim 10, wherein the plurality of content items comprise:
a static three-dimensional content item that occupies a constant space; and
a dynamic three-dimensional content item that occupies a space that varies according to a predefined rule.

16. The electronic device of claim 15, wherein the controller generates a bounding box of the dynamic three-dimensional content item having a maximum size of a space occupied by the dynamic three-dimensional content item that varies according to the predefined rule.

17. The electronic device of claim 10, wherein the controller adds a preset offset value to the minimum distance and moves the moved three-dimensional content item along the Z-axis direction.

18. The electronic device of claim 10, wherein the controller provides at least one of a visual feedback, an acoustic feedback, and a tactile feedback, when the moved three-dimensional content item overlaps the portion of the another three-dimensional content item.

* * * * *